US012597557B2

(12) United States Patent
Banaszczyk et al.

(10) Patent No.: US 12,597,557 B2
(45) Date of Patent: Apr. 7, 2026

(54) DRY HIGH VOLTAGE INSTRUMENT TRANSFORMER

(71) Applicant: ABB Schweiz AG, Baden (CH)

(72) Inventors: Jędrzej Banaszczyk, Wieliczka (PL); Bartłomiej Adamczyk, Sieniawa (PL); Michał Rzepecki, Cracow (PL); Wojciech Wysocki, Cracow (PL)

(73) Assignee: ABB Schweiz AG, Baden (CH)

( * ) Notice: Subject to any disclaimer, the term of this patent is extended or adjusted under 35 U.S.C. 154(b) by 938 days.

(21) Appl. No.: 17/828,543

(22) Filed: May 31, 2022

(65) Prior Publication Data

US 2022/0384094 A1 Dec. 1, 2022

(30) Foreign Application Priority Data

May 31, 2021 (EP) .................................... 21176971

(51) Int. Cl.

| | |
|---|---|
| ***H01F 38/20*** | (2006.01) |
| ***H01F 27/02*** | (2006.01) |
| ***H01F 27/24*** | (2006.01) |
| ***H01F 27/32*** | (2006.01) |

(52) U.S. Cl.

CPC ............. *H01F 38/20* (2013.01); *H01F 27/02* (2013.01); *H01F 27/24* (2013.01); *H01F 27/324* (2013.01)

(58) Field of Classification Search

CPC .......... H01F 38/20; H01F 27/02; H01F 27/24; H01F 27/324; H01F 27/321; H01F 27/022; H01F 38/26; H01F 38/30; H01F 27/327; H01F 27/36; H01B 3/47

See application file for complete search history.

(56) References Cited

U.S. PATENT DOCUMENTS

| | | | | |
|---|---|---|---|---|
| 2,925,570 A * | 2/1960 | Strock | H01F 38/30 | 336/190 |
| 3,222,625 A * | 12/1965 | Ledocq | H01F 38/30 | 336/174 |
| 3,255,512 A * | 6/1966 | Lochner | H01F 41/005 | 336/83 |

(Continued)

FOREIGN PATENT DOCUMENTS

| | | |
|---|---|---|
| EP | 2281294 B1 | 1/2012 |
| EP | 2800113 B1 | 3/2016 |

(Continued)

*Primary Examiner* — Mang Tin Bik Lian

(74) *Attorney, Agent, or Firm* — Fitch Even Tabin & Flannery LLP

(57) ABSTRACT

A dry high voltage (HV) instrument transformer in the form of a HV current transformer includes a core casing having a secondary winding, a top housing, a primary winding, and a dry bushing, wherein the core casing comprises an insulation containing an electrically insulating material made of PES nonwoven impregnated and cured with low viscosity epoxy. The dry HV instrument transformer in the form of a HV voltage transformer includes a bottom tank housing, a cast of a primary winding module with an embedded screen surrounding the primary winding, a field grading disc, and a core, wherein the cast of the primary winding module is made of an insulating composite containing an electrically insulating material made of PES nonwoven impregnated and cured with low viscosity epoxy.

13 Claims, 4 Drawing Sheets

(56) References Cited

U.S. PATENT DOCUMENTS

| | | | | | |
|---|---|---|---|---|---|
| 3,380,009 | A * | 4/1968 | Miller | H01F 38/30 | |
| | | | | 336/84 R | |
| 4,808,910 | A * | 2/1989 | Kessi | H02B 11/26 | |
| | | | | 336/174 | |
| 2019/0198241 | A1 * | 6/2019 | Banaszczyk | H01F 27/29 | |
| 2021/0027936 | A1 * | 1/2021 | Tal | B60R 19/12 | |

FOREIGN PATENT DOCUMENTS

| | | | | |
|---|---|---|---|---|
| EP | 2992538 | B1 | 10/2017 | |
| EP | 3239997 | A1 | 11/2017 | |
| GB | 1256076 | A | 12/1971 | |
| JP | 60-091606 | * | 5/1985 | |
| JP | 1-125913 | A | 5/1989 | |
| WO | WO-2009146569 | A1 * | 12/2009 | H01F 38/20 |

* cited by examiner

-PRIOR ART-

-PRIOR ART-

DRY HIGH VOLTAGE INSTRUMENT TRANSFORMER

CROSS-REFERENCE TO RELATED APPLICATIONS

This patent application claims priority to European Patent Application No. 21176971.6, filed on May 31, 2021, which is incorporated herein in its entirety by reference.

FIELD OF THE DISCLOSURE

The present disclosure relates to a dry high voltage (HV) instrument transformer in the form of a HV current transformer or a HV voltage transformer.

BACKGROUND OF THE INVENTION

European Patent No. 2281294 B1 discloses a high-voltage transducer comprising insulation, which includes a compressible silicone gel insulation. Compressible insulation permits the application of available transducer constructions for strongly varying temperature ranges, a conventionally necessary oil compensation bellows can be avoided and furthermore the high voltage measuring transducer can be cheaply produced.

European Patent No. 2800113 B1 discloses a HV dry instrument transformer having a form of a current transformer or a voltage transformer, wherein the column insulating body of the dry HV instrument transformer has a form of a dry capacitor bushing wound as a block of a spacer sheet. The HV current transformer has a head insulating body for electrical insulation of a secondary winding assembly from a primary winding conductor. For the HV current transformer, the head insulating body has a form of a capacitor bushing being in contact with an insulating member. The HV voltage transformer has a primary winding being in contact with an insulating member. A column insulating body has an impregnation material having substantially the same coefficient of thermal expansion as a material of the insulating member. The insulating member has a form of a hardenable resin in both types of the transformer.

European Patent No. 2992538 B1 discloses a high-voltage instrument transformer having a form of a current transformer or a voltage transformer. The HV instrument transformer is characterized in that the current transformer has a head insulating body in a form of a bushing for electrical insulation of a secondary winding assembly from a primary winding conductor. A head insulating body is placed within a conductive encapsulation and the head insulating body is in contact with an insulating member. The insulating member is made of an elastic conformable material which tightly adheres to matching outer surfaces of the head insulating body of the current transformer and the conductive encapsulation. Furthermore, the insulating member can be made of electrically conductive polymer or electrically conductive elastomer material.

Furthermore, European Patent Application No. 3239997 A1 discloses a HV apparatus, in particular, a HV dry instrument transformer, which has a form of a current transformer, a voltage transformer or a combined transformer with an insulating gel. The apparatus is characterized in that it comprises at least two electrically conductive elements such as a head transformer cover, a head housing base, a core casing, a primary conductor, a bottom external housing, a bottom support flange, a core and an electric insulation material comprising an insulating gel filling enclosed space between the conductive elements. Further, at least one of the electrically conductive elements has a coating made of a solid insulating material separating the surface of the at least one electrically conductive element from the insulating gel.

In the concept of dry HV current transformers known from the prior art (FIG. 1*a*), the surface of a core casing (1*a*) is on ground potential, while a top housing (2*a*) and a current track (3*a*) are on high potential. Dielectric insulation between these elements is realized by means of a large quantity of a compressible silicone material (4*a*), which is relatively expensive. On top of that, the surfaces of metallic elements need to be coated with a high dielectric strength coating (5*a*) to improve the dielectric strength of the disclosed insulation system.

In turn, in the concept of dry HV voltage transformers known from the prior art (FIG. 1*b*), the surface of a primary winding module (1*b*) and a field grading disc (2*b*) are on high potential. For this reason, it is necessary to provide electrical insulation between these elements and a grounded core (3*b*), as well as a grounded bottom tank (4*b*). This requires a relatively high amount of an insulating material (5*b*), such as e.g., a compressible microsphere filled silicone gel, to fill the entire volume of the grounded bottom tank (4*b*). Such approach generates additional cost and raises the probability of defects formation in the disclosed insulation system due to a larger amount of an insulating gel. Analogously to the case the dry HV current transformer, some parts of the grounded bottom tank (4*b*) may need to be coated with a high dielectric strength coating (6*b*) to improve the dielectric strength of the disclosed insulation system.

As it can be seen from the cited examples, electrical insulation in dry HV transformers needs to be provided as follows: In dry HV current transformers between: grounded core casing and top housing, which is on HV potential, and grounded core casing and current track, which is on HV potential. In dry HV voltage transformers between: grounded bottom tank and the surface of the tip of the bushing, which is on HV potential, and grounded core and the surface of the cast primary winding coil, which is on HV potential.

One of the most critical issues in high voltage instrument transformers when changing from oil-impregnated paper insulation to dry insulation is to keep the reliability of the dry insulation on at least a similar level as the reliability of the oil-impregnated paper insulation. To achieve it solutions from the prior art require a large volume of insulating material, such as a compressible silicone gel, which is relatively expensive and significantly influences the final production costs of a high voltage instrument transformers, a HV current transformers and a HV voltage transformers as well.

BRIEF SUMMARY OF THE INVENTION

The present disclosure describes a high voltage instrument transformer a with reduced amount of used insulation material while still providing high reliability of insulation in dry HV transformers.

In one aspect, the present disclosure describes a dry high voltage instrument transformer in the form of a HV current transformer comprising a core casing provided with a secondary winding, a top housing, a primary winding, and a dry bushing, wherein the core casing comprises an insulation for its electrical insulation from the primary winding and from the top housing. The insulation comprises an insulating composite containing an electrically insulating material made of PES nonwoven impregnated and cured with low viscosity epoxy.

BRIEF DESCRIPTION OF THE SEVERAL VIEWS OF THE DRAWING(S)

In the disclosure that follows, preferred embodiments are described with reference to the attached drawings.

DETAILED DESCRIPTION OF THE INVENTION

Figure 1A:
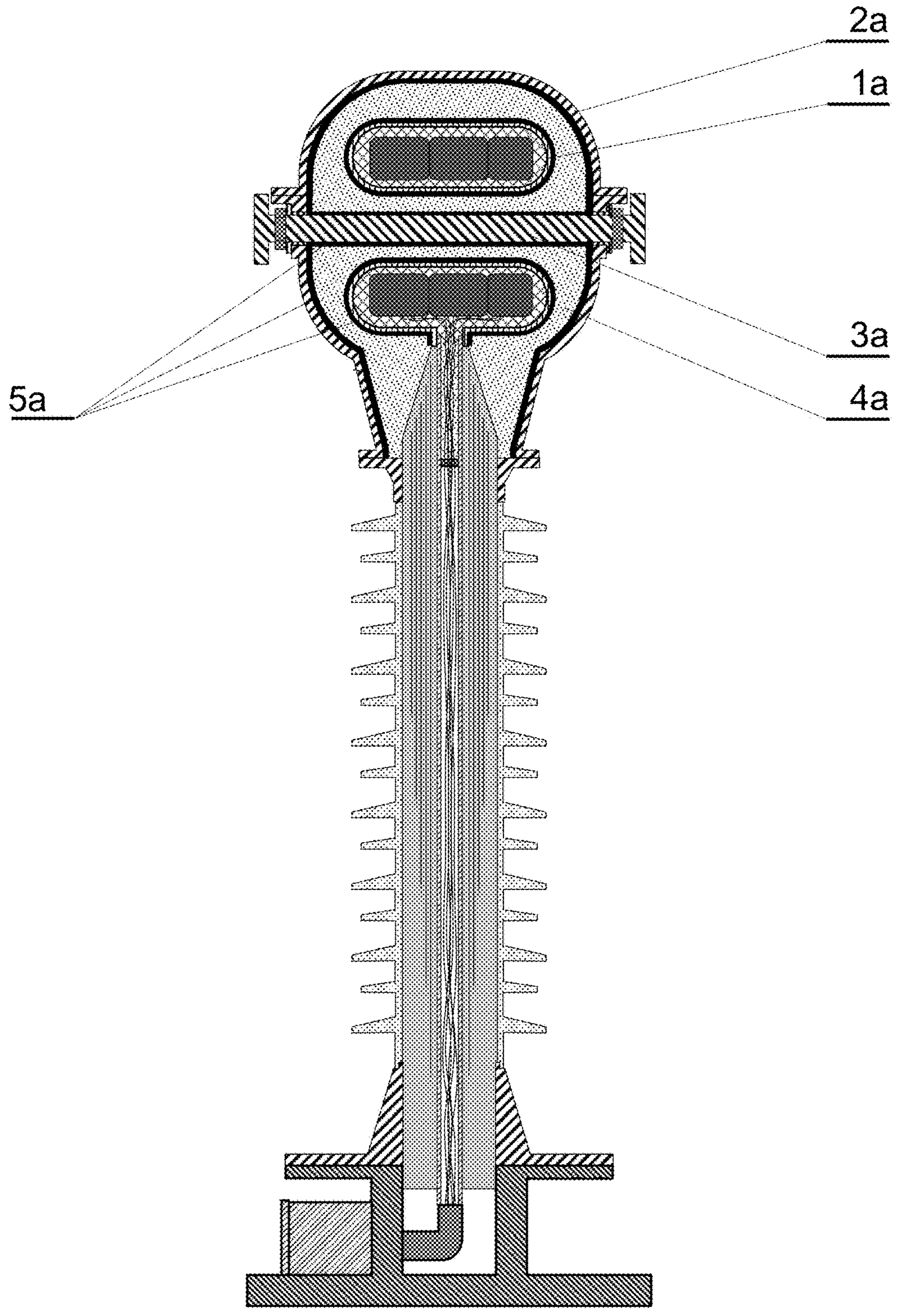
FIG. 1A shows a dry high-voltage current transformer according to the prior art.
Figure 1B:
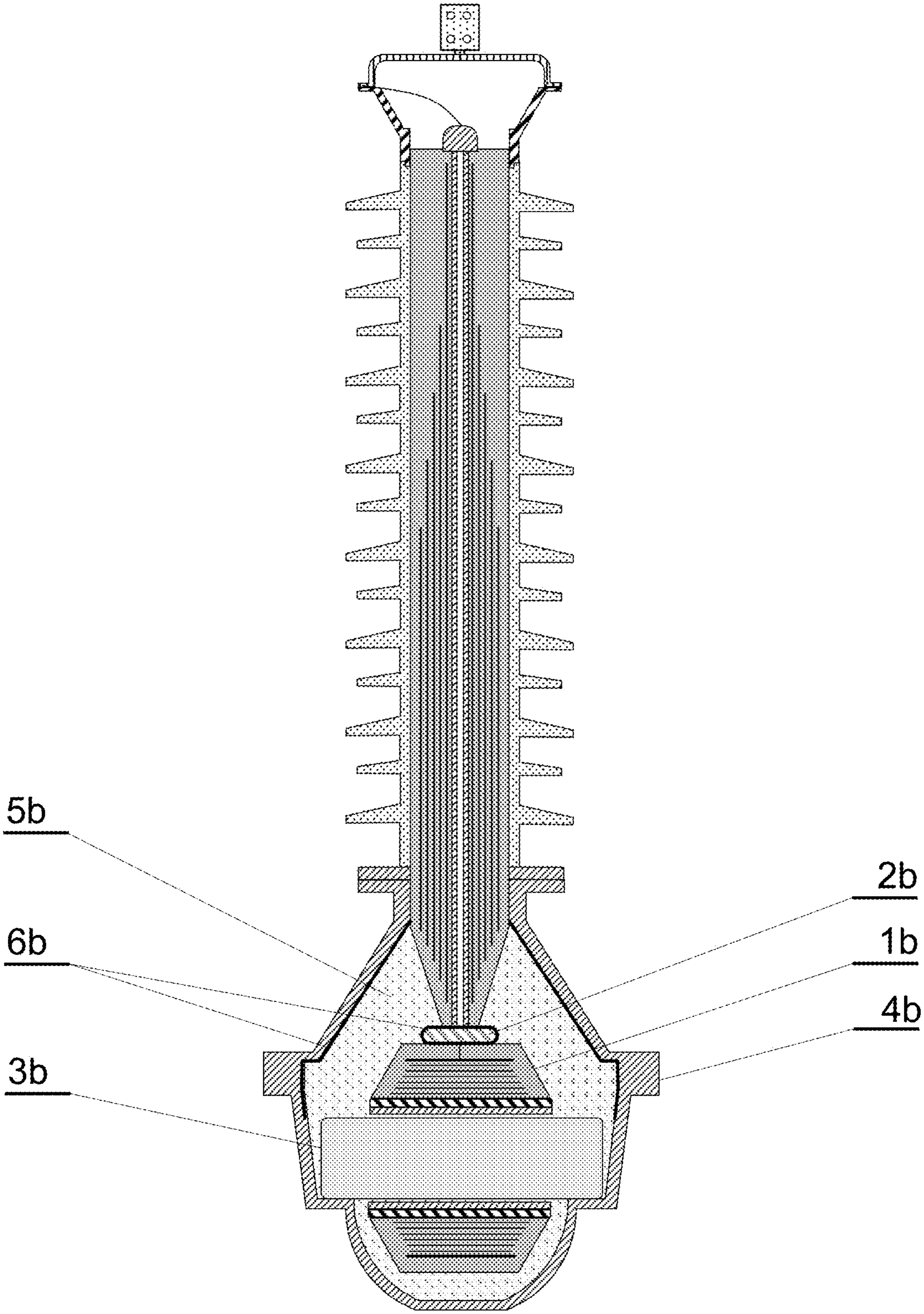
FIG. 1B shows a dry high-voltage voltage transformer according to the prior art.
Figure 2:
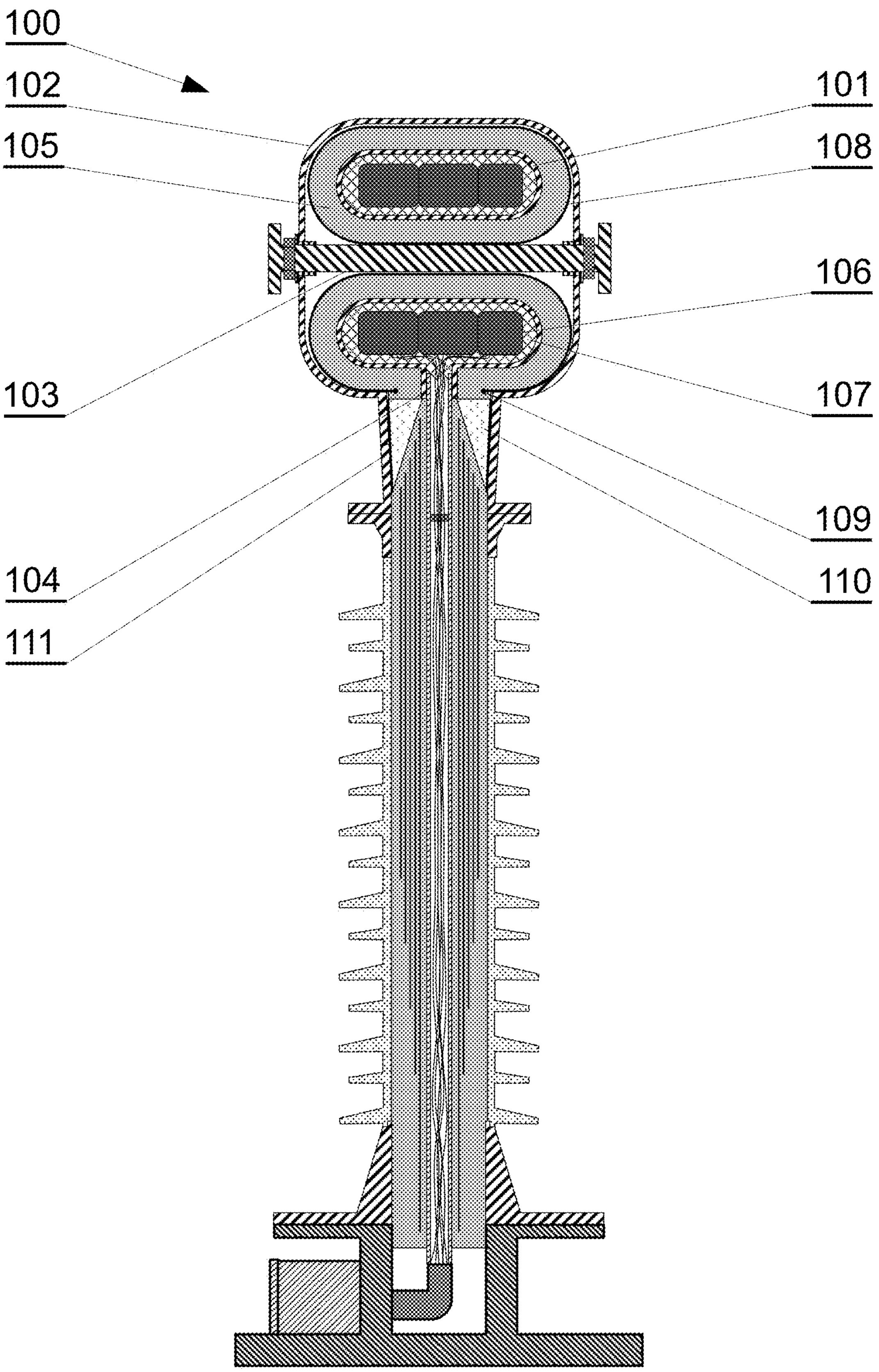
FIG. 2 shows a dry high-voltage current transformer in accordance with the disclosure.

In accordance with a first embodiment of the present disclosure, a dry high voltage instrument transformer in the form of a HV current transformer 100 is shown in FIG. 2. The HV current transformer 100 comprises a core casing 101 provided with a secondary winding 106. The core casing is filled with a resilient filler material 107, such as a PUR foam which is light and inexpensive.

The HV current transformer 100 further comprises a current track constituting a primary winding 103, a dry bushing 104 and a top housing 102. The core casing 101 is insulated from the top housing 102 and from the current track 103 by insulation 105.

The insulation 105 comprises an insulating composite containing an electrically insulating material, which is made of PES nonwoven impregnated and cured with low viscosity epoxy. For example, the PES nonwoven can be made of polyester, cotton and viscose and the low viscosity epoxy can be made of Araldite Casting Resin System by Vantico Ltd.

(https://www.chemcenters.com/images/suppliers/169257/Araldite%20F,%2OHY%20905,%2 0DY%20040,%20DY%20061.pdf)

The insulating material made of the PES nonwoven forms the backbone of the insulation similar to traditional crepe paper. The difference is that the PES nonwoven can be easily impregnated with low viscosity epoxy in all directions, which is very difficult to achieve in the case of crepe paper. As a result the application of the insulation 105 provides an increase of insulation reliability in the HV current transformer 100 and allows to limit the amount of a used compressible silicone insulation material thereby reducing the material costs in the production of the HV current transformer 100 compared to solutions known from the prior art.

Furthermore, the insulation 105 is equipped with a high voltage screen 108 which is located on the side of the insulation 105 opposite to the core casing 101. What is more, the high voltage screen 108 is terminated with a field-shaping ring 109. The high voltage screen 108 is made of an easily impregnatable semi-conductive nonwoven. The semi-conductive nonwoven can be made of polyester, cotton and viscose wherein for instance a surface of non-woven is impregnated with carbon. Such insulation structure can be impregnated with low viscosity epoxy and cured. The application of the high voltage screen 108 provides increased dielectric strength of the insulation 105. Further, the application of the high voltage screen 108 ensures that the insulation is free from voids and cracks, which provides operation of the HV current transformer 100 free of partial discharges. Furthermore, the insulated and screened core casing 101 does not require any additional insulation from the top housing 102 or the current track 103 made of a compressible silicone material.

The internal surface of the top housing 102 is provided with a high dielectric strength coating 111 what further improve the dielectric strength of the insulation of the HV current transformer 100.

The HV current transformer 100 further comprises insulation 110 made of a compressible silicone material. The insulation 110 is located between the connection point of the dry bushing 104 and the core casing 101 and the top housing 102, wherein the connection point of the dry bushing 104 and the core casing 101 are on ground potential, and the top housing 102 is on HV potential. The compressible silicone material can be for instance a silicone elastomer, such as Liquid Silicon Rubber LSR, or silicone gel, polyurethane gel, urethane modified epoxy gel can be used. As an exemplary material one of the following material can be chosen: Silicone gel Q-Gel 331 from ACC Silicones LTD, Polyurethane gel MPP-V37A from Northstar Polymers LLC, Urethane modified epoxy gel-Polymer system super gel 9 from Master Bond In.

Owing to the disclosed solution an amount of the compressible silicone insulation material 110 is greatly reduced, as it is largely replaced with the much less expensive PES nonwoven composite insulation 105 to which most electrical stresses are confined. The composite insulation 105 has higher dielectric strength than the compressible silicone insulation material 110, so it can be made much thinner. This renders it possible to significantly reduce the dimensions and weight of the top housing 102 as well.

Figure 3:
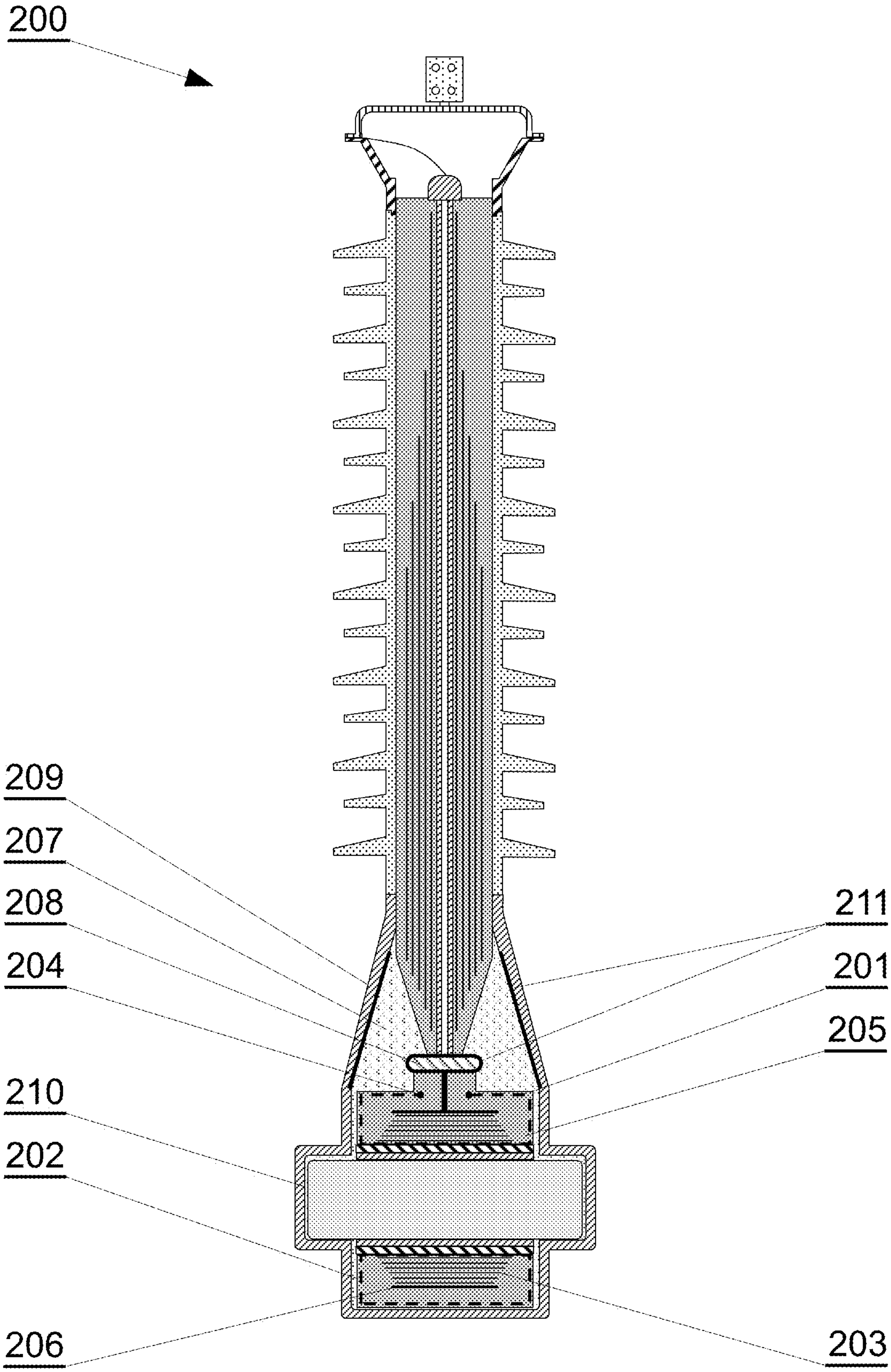
FIG. 3 shows a dry high-voltage voltage transformer in accordance with the disclosure.

In accordance with a second embodiment of the present disclosure, a dry high voltage instrument transformer in the form of a HV voltage transformer 200 is shown in FIG. 3. The HV voltage transformer 200 comprises a bottom tank housing 209 and a cast of a primary winding module 201 with an embedded screen 202 surrounding the primary winding 203. The cast of the primary winding module 201 is made of the insulating composite 205 containing an electrically insulating material made of PES nonwoven impregnated and cured with low viscosity epoxy. The PES nonwoven is easily impregnable in all directions and not mostly parallel to its surface, as it is in the case of crepe paper.

The application of the insulation 205 comprising an insulating composite containing an electrically insulating material made of PES nonwoven impregnated and cured with low viscosity epoxy provides an increase of reliability of insulation in the HV voltage transformer 200 and allows to limit the amount of used compressible silicone insulation material thereby reducing the material costs in the production of the HV voltage transformer 200 comparing to solutions known from the prior art.

The screen 202 is made of an easily impregnable semi-conductive material, such as semi-conductive PES nonwoven. The semi-conductive nonwoven can be made of polyester, cotton and viscose. Further, the screen 202 is terminated with a field grading ring 204 to prevent occurring harmful stresses at the edge of the screen 202. The field grading ring 204 is insulated from the primary winding screen 202 by the cast of the primary winding module 201.

The HV voltage transformer 200 also comprises a field grading disc 208 and a core 210.

The screen 202 and the core 210 are grounded while in use.

The HV voltage transformer 200 further comprises a primary winding HV screen 206, wherein the primary winding HV screen 206 is insulated from the primary winding screen 202 by the cast of the primary winding module 201 and a distance between the primary winding HV screen 206 and the primary winding screen 202 is determined based on the dielectric strength of the insulating composite 205 and the adopted margin of safety. The distance is such as to avoid the risk of electrical breakdown caused by the electrical stress during routine tests, for example the power frequency withstand voltage tests and lightning impulse tests and/or subsequent long term operation of the dry HV voltage transformer 200.

The HV voltage transformer further comprises a compressible silicone insulation material 207 between the field grading disc 208, the internal surface of the bottom tank housing 209, and the screen 202. Owing to the disclosed solution an amount of the compressible silicone insulation material 207 is greatly reduced, as it is largely replaced with the much less expensive PES nonwoven composite insulation 205 to which most electrical stresses are confined. The composite insulation 205 has higher dielectric strength than the compressible silicone material 210, so it can be made much thinner. This renders it possible to significantly reduce the dimensions and weight of the bottom tank housing 209 as well.

Furthermore, the HV voltage transformer comprises an additional layer of high dielectric strength coating 211 as well, what further improve the dielectric strength of the insulation of the HV voltage transformer 200.

The application of the insulation comprising an insulating composite containing an electrically insulating material made of PES nonwoven impregnated and cured with low viscosity epoxy provides an increase of reliability of insulation in the HV current. Insulation according to the invention made of PES nonwoven impregnated and cured with low viscosity epoxy forms void free and crack free insulation and is characterized by very high dielectric strength.

Furthermore, the application of the insulation and the high voltage screen ensures that it is not necessary to insulate the inside surface of the top housing and/or the surface of the primary winding of the HV current transformer. This allows for limiting the amount of a used compressible silicone insulation material thereby reducing the material costs for production costs of the HV current transformer compared to solutions known from the prior art.

Further the application of the mentioned insulation ensures significant reduction of the dimensions and weight of the top housing.

Preferably, the insulation is equipped with a high voltage screen which is located on the side of the insulation opposite to the core casing.

Preferably, the high voltage screen is made of an easily impregnatable semi-conductive nonwoven.

Preferably, the high voltage screen is terminated with a field-shaping ring.

Preferably, the dry HV current transformer further comprises insulation between the connection point of the dry bushing and the core casing and the top housing.

Preferably, the insulation between the connection point of the dry bushing and the core casing and the top housing is realized by means of a compressible silicone material.

Preferably, the internal surface of the top housing is provided with a high dielectric strength coating.

In another aspect, the present disclosure describes a dry high voltage instrument transformer in the form of a HV voltage transformer comprising a bottom tank housing, a cast of a primary winding module with an embedded screen surrounding the primary winding, a field grading disc, and a core. The cast of the primary winding module is made of an insulating composite containing an electrically insulating material made of PES nonwoven impregnated and cured with low viscosity epoxy.

The application of the insulation comprising an insulating composite containing an electrically insulating material made of PES nonwoven impregnated and cured with low viscosity epoxy provides an increase of reliability of insulation in the HV voltage transformer. The composite insulation has higher dielectric strength than a compressible silicone material, so it can be made much thinner, causing that the amount of used compressible silicone insulation can be significantly reduced. Limitation of the amount of a used compressible silicone insulation material leads to reduction of the material costs for production costs of the HV current transformer compared to solutions known from the prior art. It allows for significantly reducing dimensions and weight of the bottom tank as well.

Preferably, the HV voltage transformer further comprises a primary winding high voltage screen, wherein the primary winding high voltage screen is insulated from the primary winding screen by the cast of the primary winding module and a distance between the primary winding high voltage screen and the primary winding screen is based on the dielectric strength of the insulating composite and the adopted margin of safety.

Preferably, the screen is made of an easily impregnable semi-conductive material, such as semi-conductive PES nonwoven.

Preferably, the screen is terminated with a field grading ring, wherein the field grading ring is insulated from the primary winding screen by the cast of the primary winding module. Termination of the screen with the field grading ring prevents occurring harmful stresses at the edge of the screen.

Preferably, the dry HV voltage transformer further comprises a compressible silicone insulation material between the field grading disc, the internal surface of the bottom tank housing, and the screen.

Preferably, the dry HV voltage transformer further comprises an additional layer of high dielectric strength coating.

Advantages of the Invention

Insulation comprising insulating composite containing an electrically insulating material made of PES nonwoven impregnated and cured with low viscosity epoxy provides an increase of reliability of insulation in dry HV transformers, both in HV current transformers and HV voltage transformers.

The application of the above-mentioned insulation allows limiting the amount of a used compressible silicone insulation material thereby reducing the material costs in the production of dry HV transformers compared to solutions known from the prior art.

Furthermore, the application of the insulation comprising insulating composite containing an electrically insulating material made of PES nonwoven impregnated and cured with low viscosity epoxy ensures significant reduction of the dimensions and weight of a top housing in a HV current transformer and a bottom tank housing in a HV voltage transformer as an amount of a required compressible insulation material in both types of said HV transformers is limited by confining the majority of the electric stress to the first mentioned insulation.

The application of the high voltage screen located on the side of the PES composite insulation opposite to the core casing of the HV current transformer provides an increase of dielectric strength of the PES composite insulation.

Termination of the screen of the HV voltage transformer with the field grading ring prevents occurring harmful stresses at the edge of the screen.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A dry high voltage (HV) current transformer, comprising:

a core casing provided with a secondary winding;

a top housing;

a primary winding; and a dry bushing;

wherein the core casing comprises an insulation that is insulatively disposed between the core casing, the primary winding, and the top housing; and wherein the insulation comprises an insulating composite containing an electrically insulating material made of PES nonwoven impregnated and cured with low viscosity epoxy, and wherein an additional insulation is disposed between the dry bushing, the core case, and the top housing, the additional insulation constructed from a compressible silicone material.

2. The HV current transformer according to claim 1, wherein the insulation further comprises a high voltage screen located on a side portion of the insulation that is oriented opposite to the core casing.

3. The HV current transformer according to claim 2, wherein the high voltage screen is made of an easily impregnatable semi-conductive nonwoven material.

4. The HV current transformer according to claim 2, wherein the high voltage screen is terminated with a field-shaping ring.

5. The HV current transformer according to claim 1, wherein an internal surface of the top housing includes a high dielectric strength coating.

6. A dry high voltage (HV) voltage transformer, comprising:

a bottom tank housing;

a cast of a primary winding module with an embedded screen surrounding the primary winding;

a field grading disc; and a core;

wherein the cast of the primary winding module is constructed from an insulating composite material containing an electrically insulating material made of PES nonwoven impregnated and cured with low viscosity epoxy; and wherein a compressible silicone insulation material is disposed between the field grading disc, the internal surface of the bottom tank housing, and the screen.

7. The HV voltage transformer according to claim 6, further comprising a primary winding high voltage screen that is insulatively from the primary winding screen by the cast of the primary winding module and a distance between the primary winding high voltage screen and the primary winding screen.

8. The HV voltage transformer according to claim 7, wherein an insulation of the primary winding depends on a dielectric strength of the insulating composite and an adopted margin of safety.

9. The HV voltage transformer according to claim 6, wherein the screen is made of an easily impregnable semi-conductive material.

10. The HV voltage transformer according to claim 9, wherein the material is semi-conductive PES nonwoven.

11. The HV voltage transformer according to claim 6, wherein the screen is terminated with a field grading ring.

12. The HV voltage transformer according to claim 11, wherein the field grading ring is insulated from the primary winding screen by the cast of the primary winding module.

13. The HV voltage transformer according to claim 6, further comprising an additional layer of high dielectric strength coating disposed on the internal surface of the bottom tank housing.

* * * * *